US006338070B1

(12) United States Patent
Nusch et al.

(10) Patent No.: US 6,338,070 B1
(45) Date of Patent: Jan. 8, 2002

(54) METHOD OF SAVING OPERATING DATA OF A NETWORK ELEMENT, AND CONTROLLER FOR A NETWORK ELEMENT

(75) Inventors: Dietmar Nusch; Monika Banzhaf, both of Stuttgart; Uwe Knebel, Bruchsal, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/334,606

(22) Filed: Jun. 17, 1999

(30) Foreign Application Priority Data

Jun. 20, 1998 (DE) ........................................ 198 27 637

(51) Int. Cl.[7] ................................................ G06F 17/30

(52) U.S. Cl. ....................... 707/103; 707/102; 709/223; 709/231

(58) Field of Search ............................ 707/1, 102, 103, 707/104; 709/223, 220, 231; 705/54; 370/249

(56) References Cited

U.S. PATENT DOCUMENTS

| | | | | |
|---|---|---|---|---|
| 5,608,720 A | * | 3/1997 | Biegel et al. ............... | 370/249 |
| 5,832,224 A | * | 11/1998 | Fehskens et al. ........... | 709/223 |
| 5,982,891 A | * | 11/1999 | Ginter et al. ................. | 705/54 |

FOREIGN PATENT DOCUMENTS

| | | | |
|---|---|---|---|
| DE | 42 38 875 A1 | 5/1994 | ........... H04L/12/26 |
| DE | 195 13 892 A1 | 10/1996 | ........... H04L/12/26 |

OTHER PUBLICATIONS

S. Colombo, et al.: "Technologie der SDH–Netzelements: die Software–Plattform", Elektrisches Nachrichtenwesen, $4^{th}$ Quarter 1993, pp. 322–328.

CCIT Recommendation X.720 (Jan. 1992).

(IEEE publication, Apr. 2000) Alexander et al. "Secure quality of service handling:SQoSH" paper in IEEE communication Magazine, vol 38, No. 4, pp. 106–112.*

(IEEE publication, Apr. 2000) Feldman et al. NetScope: traffic engineering for IP network, IEEE Network, vol. 14, No. 2, pp. 11–19.*

IEEE publication, "A wide dynamic range porgarmmable synapse for impulse neural networks" by Chintrakulchai et al., Circuits and systems 1990, p. 2975–2977, vol 4 (May 1990).*

* cited by examiner

*Primary Examiner*—Diane Mizrahi
(74) *Attorney, Agent, or Firm*—Sughrue Mion, PLLC

(57) ABSTRACT

Operating data of a controller for a network element must be saved in a nonvolatile storage. The operating data are present in the form of managed objects. The method of saving the operating data involves dividing the managed objects into groups (A, B, C) and assigning a group-specific software module to each of the groups. To save one of the managed objects (MO) the operating data of the object are stored using the associated group-specific software module (MOD_A, MOD_B, MOD_C). This makes it possible to take into account the different requirements with respect to access capabilities, robustness, and speed of the different managed objects, and to increase access speed.

11 Claims, 2 Drawing Sheets

METHOD OF SAVING OPERATING DATA OF A NETWORK ELEMENT, AND CONTROLLER FOR A NETWORK ELEMENT

BACKGROUND OF THE INVENTION

This invention relates to a method of saving operating data of a controller of a network element as set forth in the preamble of claim 1, and to a controller for a network element as set forth in the preamble of claim 9.

Network elements are facilities of a communications network which serve, for example, to establish connections within the network, provide access to the network, switch connections in the network, or change the format of messages which are transmitted in the network. In a communications network based on the synchronous digital hierarchy (SDH) or in a synchronous optical network (SONET), network elements include crossconnects, add/drop multiplexers, and line multiplexers.

Such network elements contain a controller for controlling and monitoring network-element-specific functions. In an article by S. Colombo et al, "Technologie der SDH-Netzelements: die Software-Plattform", Elektrisches Nachrichtenwesen, 4th Quarter 1993, pp. 322–328, it is described that network elements operate and are controlled in accordance with an object-oriented specification which has been defined by international standards committees such as CCITT (now ITU-T), ETSI, or ANSI. Functions of the network elements are described and implemented in the form of managed objects (MO).

Managed objects are real life images—and thus descriptions of static and dynamic properties—of physical or virtual components (resources) of the managed network element. In CCITT Recommendation X.720 (01/92), a managed object is defined as an abstraction of data processing and data communications resources (e.g., protocol state machines, connections, and modems) for the purposes of management.

The controller of a network element, according to the above article by S. Colombo et al, contains a CPU, a memory, and a permanent ("persistent") storage. The memory contains a number of managed objects, which are saved in the permanent storage. The saving of the managed objects in the permanent storage is slow and, because of the large number of managed objects in the memory, results in a bottleneck.

SUMMARY OF THE INVENTION

It is an object of the invention to provide a method of saving operating data of a network element which is faster than prior-art saving methods. Another object is to provide a network element controller which is suitable for carrying out the method.

These objects are attained by the features of claim 1 and claim 9, respectively. Further advantageous aspects of the invention are defined in the dependent claims.

One advantage of the invention is that it ensures consistency of the data saved in the nonvolatile storage. After receipt of a commit, any change to a managed object is saved in the nonvolatile storage, thus ensuring that the nonvolatile storage always contains a consistent backup copy of the data from the memory. Thus, after a system crash, the last valid state can be restored.

Advantageously, the nonvolatile storage is structured as a database. This reduces the amount of data to be saved and the data can be retrieved more quickly.

BRIEF DESCRIPTION OF THE DRAWINGS

The invention will become more apparent from the following description of an embodiment when taken in conjunction with the accompanying drawings, in which.

DETAILED DESCRIPTION OF THE INVENTION

Figure 1:
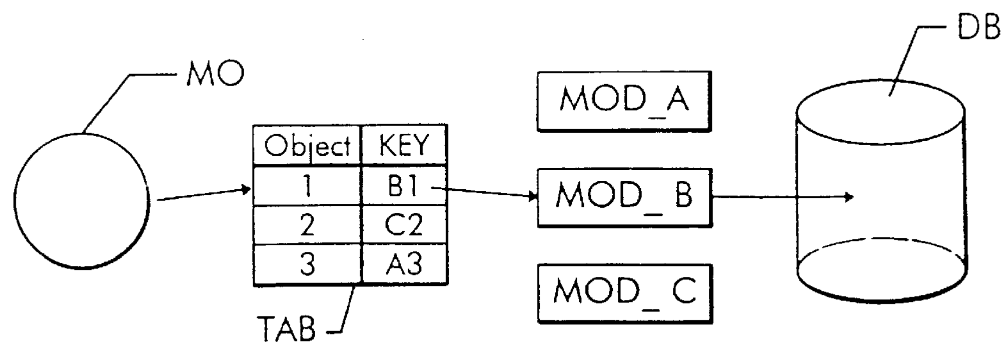
FIG. 1 shows schematically the sequence of steps of a saving process in accordance with the invention.

Managed objects are images of physical or virtual components of the network element which describe the static and dynamic properties of the respective component. A managed object is an instance of a managed object class. Such a managed object class is defined by its attributes, the operations executable by its objects, the notifications which can be emitted by its objects, and its related behavior. Each managed object has a distinguished, unambiguous name. From a management point of view, a managed object exists if it has a distinguished name and supports the operations and notifications defined for its class.

The entirety of the managed objects existing in a network element, together with their attributes, is referred to as a Managed Information Base (MIB) and reflects the current configuration of the network element. The managed objects are stored in a memory (generally a RAM) and are saved in a database which is contained in a nonvolatile storage (e.g., a hard disk) of the network element. This database is also referred to as a persistent database.

A network element of a telecommunications network is controlled and managed using such managed objects. To be able to restore the last valid configuration of the communications network in the event of a failure, for example after a system crash or a power failure, it is necessary to save the operating data of the network element in the nonvolatile storage. The operating data are mainly the data assigned to the attributes of the managed objects. Thus, "operating data" as used herein means configuration parameters as well as event and status data. It is necessary for the operating data saved in the nonvolatile storage to be consistent with the current contents of the main memory of the network element controller. "Consistent" as used herein means that each committed change to a managed object must be stored in the nonvolatile storage. It is also necessary that the saving process should be robust against disturbances, e.g., that even after a system failure during a write access to the nonvolatile storage, a version of the last valid operating data is present which permits a complete restoration of the system after the system failure.

The nonvolatile storage is advantageously structured as a database. It is required that the database accesses executed for saving the operating data do not or only slightly reduce the capacity of the network element. The invention is therefore predicated on recognition that fast write accesses are required. Read accesses, however, need not be executed with a high speed, since they are generally of importance only in the event of a restoration of the network element configuration. Conventional databases, such as relational or object-oriented databases, do not meet the above requirements for speed and robustness.

A basic idea of the invention is to divide the managed objects into groups. In the event of a write access during which the attributes of a changed or newly created managed object have to be saved, access to the nonvolatile storage is obtained using a group-specific software module. Reading of stored operating data from the database is also effected using the group-specific software module. Through the use of such group-specific software modules, different requirements in terms of access capabilities, robustness, and speed of the different managed objects can be taken into account. These requirements therefore form the criteria of the division of the managed objects into groups.

The software modules are executable program parts or subprograms consisting of control instructions which are encoded in a machine language and can be executed by a processor. Each group of managed objects is assigned one group-specific software module.

FIG. 1 shows schematically the sequence of steps of a saving process. A managed object MO is to be saved. A table TAB contains access keys KEY for all managed objects, which specify the location in the nonvolatile storage. The group to which the managed object MO to be saved belongs is known from its object class: The managed object MO belongs to group B, the group of the log files. Accordingly, the software module MOD_B, which is in charge of group B, is used for obtaining access to the database DB. By means of the table, the access key KEY for the managed object MO is determined.

Figure 2:
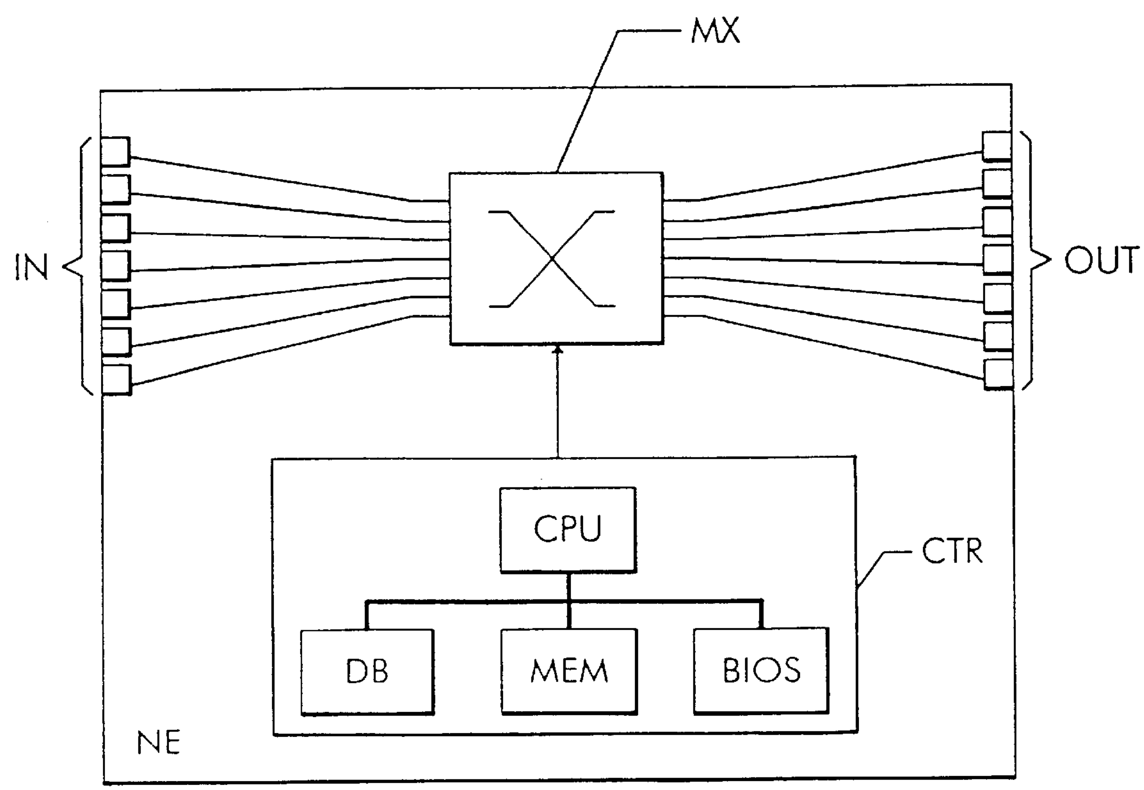
FIG. 2 shows a network element controller in accordance with the invention.

An embodiment of a network element controller according to the invention is shown in FIG. 2. The network element NE is a digital crossconnect of a synchronous digital communications system based on the recommendations for SDH (synchronous digital hierarchy) or SONET (synchronous optical network). In such a communications network, the traffic is transferred in synchronous transport modules. The crossconnect has a switching matrix MX, with which connections are switched, both in the space domain and in the time domain, between inlets IN and outlets OUT. In addition, the crossconnect arranges subunits of the transport modules, so-called virtual containers, between the transport modules. In this manner, virtual connections can be established in the communications network by means of such a crossconnect. At the inlets IN and outlets OUT, STM-4 signals (STM=synchronous transport module) are processed.

There exists one managed object for each termination point of the switching matrix. In addition, managed objects exist for all established virtual connections.

Physically, the crossconnect is composed of a plurality of printed circuit boards, each of which is controlled by an on-board controller of its own. For each board, too, there is a managed object, which describes the functions and configurations of the board.

The network element NE contains a controller CTR which controls and monitors the functions of the network element, detects failures, generates corresponding error messages, and receives and processes requests from a higher-level management system of the communications network. The controller comprises a processor CPU for controlling the network element, a memory MEM containing the managed objects, and a nonvolatile storage DB. The nonvolatile storage is a hard disk, but it is also possible to use other data carriers or other nonvolatile memory types. The controller further includes another memory BIOS, for example an EEPROM or a second hard disk, in which an operating system is stored. In the embodiment shown, the operating system is a UNIX system. The memory BIOS also contains the group-specific software modules necessary for the operating data. Physically, the memory BIOS may also be combined with the nonvolatile storage DB in a single storage medium.

Figure 3:
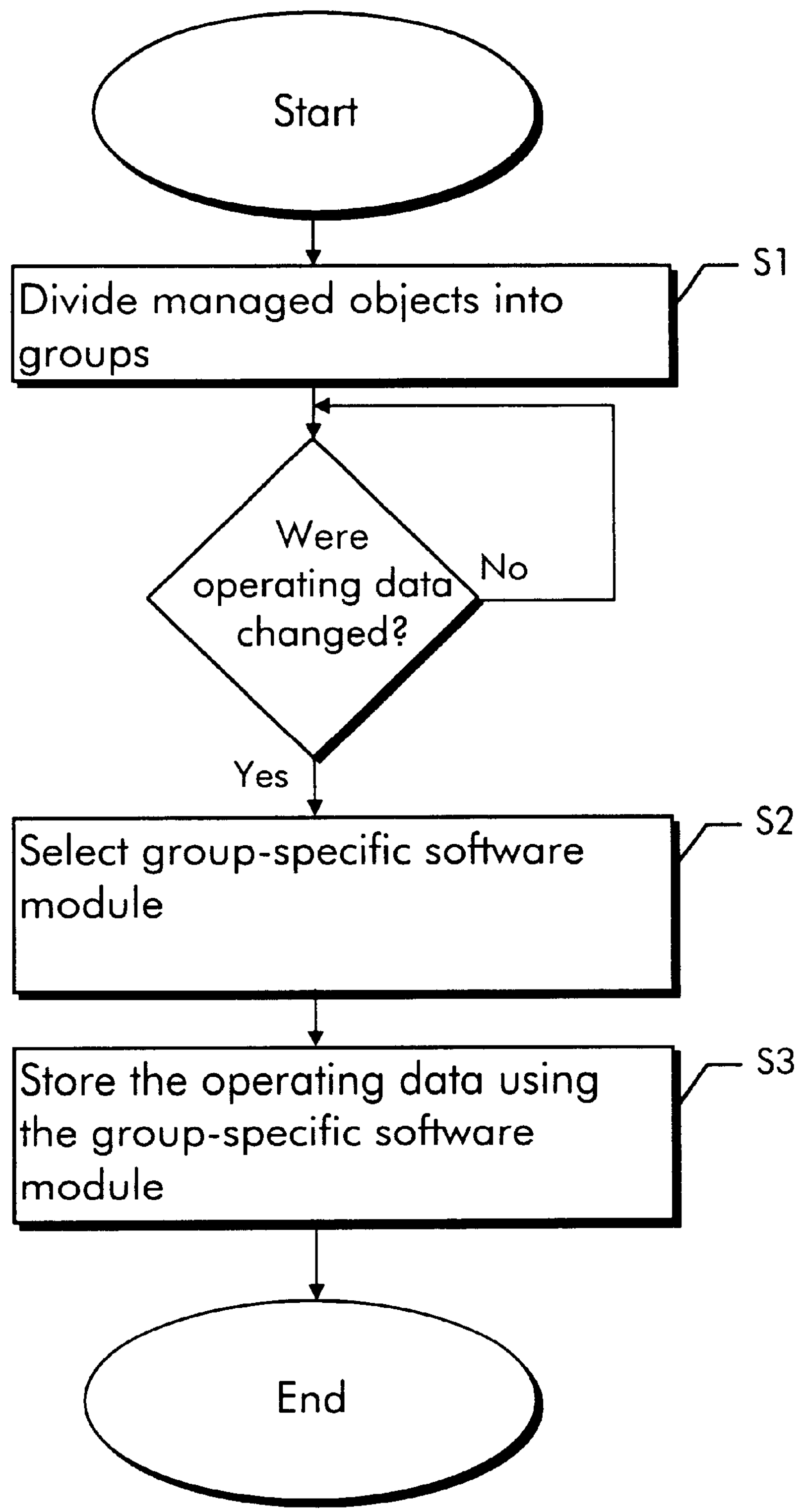
FIG. 3 is a flowchart of the saving method in accordance with the invention.

Referring to FIG. 3, the method of saving operating data of the network element comprises the following initial step:

Step S1: Dividing the managed objects into groups. The grouping is predetermined and is dependent on the object class of the respective managed object. It takes into account the requirements for access capabilities (read, write, change), robustness, and speed of the different managed objects.

If the operating data of a changed or newly created managed object are to be saved, the following steps are taken:

Step S2: Selecting the group-specific software module assigned to the group to which the managed object to be saved belongs; and Step S3: Storing the operating data of the managed object using the group-specific software module.

In the embodiment, the following groups of managed object are provided:

Group A: This group includes all managed objects whose data entries have a variable length, such as objects of termination points of the switching matrix, objects for virtual connections, and objects for printed circuit boards. The data entries of these managed objects in the nonvolatile storage can be created, changed, and deleted. In case of changes, their length can be changed. Write access is accomplished by writing the operating data of a managed object of this group to be saved into a free area of the nonvolatile storage and, after successful completion of the write access, marking the area containing the prior version of the object as free.

Group B: Group B comprises managed objects for log files. These entries can be created and deleted but never changed. For operating data of objects of Group B, an area of the read-only memory of predetermined size is provided. When the memory capacity of this area has been used up, the area is cleared up by the group-specific software module by deleting old entries.

Group C: Group C comprises managed objects for performance monitoring, a regular process which takes place every 15 min and every 24 h. The data entries have a fixed length which does not change if the entries are changed. The nonvolatile storage contains a predetermined number of data entries which are periodically replaced. Each monitored unit of the network element is assigned two entries in the nonvolatile storage which are alternately overwritten with new operating data.

For these three groups, the memory BIOS contains group-specific software modules which execute the above-mentioned functions during the storage of the operating data. The software modules are memory managers for the nonvolatile storage.

If a managed object is newly created, changed, or deleted, the associated operating data in the nonvolatile storage are updated. To do this, according to the invention, the operating data are stored or deleted using the associated group-specific software module.

In the embodiment, the group membership of all managed objects is statically predetermined by the object class and is not dynamically changed. This means that, when a managed object is newly created, the type of the managed object determines the group to which the object belongs. In the database DB, separate areas are provided for the different groups where the operating data of the objects of this group are stored. The memory contains one group-specific table for each group. This table implements the mapping of the managed objects to the database areas where the operating data of the managed objects are physically stored. In the embodiment, the table is needed in order to be able to read the operating data.

For each of the managed objects, the tables contain one access key to the database. The access key specifies, for example in the form of a sequential number of an address, that location in the database where the operating data of the object to be stored can be retrieved. The association between object and access key is established via the distinguished name of the object. The access key is generated with the creation of the object. The table has the two-column form shown in FIG. 1, with the first column, Object, containing the distinguished object names 1, 2, 3, and the second column, KEY, containing the respective associated access keys.

After a system failure, e.g., a system crash, the tables can be reconstructed from the database. To this end, the database contains information about the group membership of each entry. Thus, during reconstruction, the individual physical entries of the database can be assigned to the original group tables again.

The tables can thus be filled in two ways: On the one hand, during normal operation of the network element, table entries are created during the dynamic generation of managed objects. On the other hand, after a restart of the system following a crash, for example, the tables are reconstructed from the existing entries of the database. For the reconstruction, the group membership of the database entries is stored in the nonvolatile storage. For a normal write access, during which the operating data of a changed or newly created managed object are to be stored, the group membership is known from the type of the object (object class), i.e., it is not determined from a table. Instead, when an object is newly created, an access key for the object is entered in the predetermined group-specific table.

Another possibility is to note the group to which a managed object belongs in a single table and, if an access is to be executed, to determine the group from the table in order to ascertain the correct software module for the database access.

In another preferred embodiment of the invention, a transaction which combines changes made to two or more managed objects is not saved in the nonvolatile storage until the transaction has been committed. After the commit, all changed objects are written into a free, physically coherent memory location if possible. This minimizes movements of the write heads if a hard disk is used for the nonvolatile storage.

What is claimed is:

1. A method of saving operating data of a controller of a network element which are present in the form of managed objects, said method comprising the step of writing said operating data into a nonvolatile storage of the controller after said data is updated, wherein the managed objects are divided into groups (A, B, C), with at least one of said groups containing managed objects selected from managed objects whose data entries have variable length, managed objects for log files and managed objects for performance monitoring, to each of which groups a group-specific software module is assigned, and said writing step comprises writing the operating data of a managed object to be saved using the assigned group-specific software module (MOD_B).

2. A method as claimed in claim 1 wherein the nonvolatile storage is structured as a database.

3. A method as claimed in claim 1 wherein the operating data of the managed objects are stored in separate areas of the nonvolatile storage according to the group membership of the managed objects.

4. A method as claimed in claim 1 wherein one (A) of the groups comprises managed objects whose data entries have a variable length, and wherein, to store a managed object of said group (A) to be saved, the operating data of the managed object to be saved are written into a free area of the nonvolatile storage and, after successful completion of the write access, the area containing the prior version of the object is marked as free.

5. A method as claimed in claim 1 wherein one (B) of the groups comprises managed objects for log files, and wherein, to store a managed object of said group to be saved, the operating data of the managed object to be saved are written into an area of the nonvolatile storage of a predetermined size and, when the capacity of said area has been used up, said area is cleared by deleting old entries.

6. A method as claimed in claim 1 wherein one (C) of the groups comprises managed objects for performance monitoring, and wherein for managed objects of said group, a predetermined number of data entries are provided in the nonvolatile storage which are periodically replaced for storing objects of said group.

7. A method as claimed in claim 2 wherein two or more changes made to managed objects are combined in a transaction, and wherein the changes are not transferred into the database before the transaction has been successfully completed.

8. A method as claimed in claim 2 wherein the group membership of a managed object to be saved is predetermined based on the object class of said managed object, and wherein an access key (KEY) which indicates the location of the managed object in the nonvolatile storage is entered in a table (TAB).

9. A controller for a network element comprising a processor, a memory, and a nonvolatile storage containing operating data of the network element in the form of managed objects, wherein the controller comprises group-specific software modules (MOD_A, MOD_B, MOD_C) for storing the data of managed objects to be saved, and the managed objects are divided into groups (A, B, C), to each of which one of the group-specific software modules is assigned, with at least one of said groups containing managed objects selected from managed objects whose data entries have variable length, managed objects for log files and managed objects for performance monitoring.

10. A controller as claimed in claim 9 wherein the nonvolatile storage is structured as a database.

11. A controller as claimed in claim 9 wherein separate areas are provided in the nonvolatile storage for the individual groups (A, B, C).

* * * * *